United States Patent [19]

McGrail

[11] 4,371,489

[45] Feb. 1, 1983

[54] PRODUCTION OF ANTI-STATIC THERMOPLASTICS FILMS

[75] Inventor: Patrick T. McGrail, Hitchin, England

[73] Assignee: Imperial Chemical Industries Limited, London, England

[21] Appl. No.: 197,239

[22] Filed: Oct. 15, 1980

[30] Foreign Application Priority Data

Oct. 19, 1979 [GB] United Kingdom ............... 7936427
Feb. 1, 1980 [GB] United Kingdom ............... 8003460

[51] Int. Cl.$^3$ .......................... B29D 7/02; B29D 7/24
[52] U.S. Cl. .................................... 264/129; 264/134; 264/171; 264/210.1
[58] Field of Search ............... 264/210.7, 210.3, 129, 264/171, 134, 210.1; 428/483, 910; 427/172, 173

[56] References Cited

U.S. PATENT DOCUMENTS

| 3,544,462 | 12/1970 | Finch et al. ...................... 252/8.6 |
| 3,819,773 | 6/1974 | Pears ............................ 264/210.7 X |
| 4,233,074 | 11/1980 | Dodwell et al. ................. 430/535 |

FOREIGN PATENT DOCUMENTS

| 2827492 | 4/1979 | Fed. Rep. of Germany . |
| 1282354 | of 1962 | France . |
| 2153123 | 5/1973 | France . |
| 2166251 | 8/1973 | France . |
| 2166265 | 8/1973 | France . |
| 2231986 | 12/1974 | France . |
| 2241092 | 3/1975 | France . |
| 687399 | 2/1953 | United Kingdom . |
| 902365 | 8/1962 | United Kingdom . |
| 1317907 | 5/1973 | United Kingdom . |
| 1350272 | 4/1974 | United Kingdom . |

OTHER PUBLICATIONS

*Research Disclosure*, Jul. 1974, pp. 32–33, disclosure No. 12346.
*Research Disclosure*, Nov. 1974, pp. 32–33, disclosure No. 12737.
*Research Disclosure*, Jan. 1978, p. 26, disclosure No. 16545.

*Primary Examiner*—Evan K. Lawrence
*Attorney, Agent, or Firm*—Cushman, Darby & Cushman

[57] ABSTRACT

A process for producing an oriented thermoplastics film, e.g. a polyethylene terephthalate film, having an anti-static layer in which the film is oriented by stretching in at least one direction, and preferably biaxially oriented by stretching in two mutually perpendicular directions, and a coating composition comprising (i) an acrylic or methacrylic copolymer, which is preferably cross-linkable and (ii) an aqueous solution of at least one partially neutralized acidic phosphate ester is applied before the commencement of or during the molecular orientation.

6 Claims, No Drawings

PRODUCTION OF ANTI-STATIC THERMOPLASTICS FILMS

The present invention relates to a process for the production of a molecularly oriented thermoplastics film having an anti-static layer.

Thermoplastics films do not generally accept superimposed coatings such as reprographic lacquers, heat-seal layers and light-sensitive photographic emulsions with satisfactory adhesion without interposing an adhesion-promoting priming layer between the film and the superimposed coating. GB patent No. 1 264 338 describes priming materials suitable for application to a biaxially oriented synthetic linear polyester film during the orientation of the film.

It has also been observed that some thermoplastics films have a tendency to accumulate electrostatic charges during handling. These electrostatic charges can introduce several disadvantages such as a fire or explosion hazard in organic-solvent-laden atmospheres especially when applying lacquers from an organic solvent, surface contamination by the attraction of dirt, difficulties in handling and the risk of fogging of light-sensitive coatings. In order to counter such disadvantages it has already been proposed in the art that such films should be rendered electroconductive in order that the charges may leak away.

The present invention relates to a specific class of anti-static materials for use in certain layers applied to the surface of a thermoplastics film during the process for its formation and orientation.

According to the present invention, a process for the production of a molecularly oriented thermoplastics film having an anti-static coating layer comprises melt extruding a self-supporting thermoplastics film, molecularly orienting the extruded film by stretching in at least one direction and applying a coating layer to at least one side of the film before the commencement of or during the molecular orientation, wherein the coating layer is applied from a film-forming composition comprising (i) a copolymer comprising as its major component comonomeric units of one or more alkyl esters of acrylic and methacrylic acids, and (ii) at least one phosphate ester chosen from compounds of the following structure:

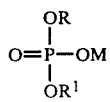

wherein:
- R represents an unreactive hydrocarbon radical optionally containing unreactive substituents and having a total of not more than 10 carbon atoms, preferably at least 2 carbon atoms and preferably not more than 7 carbon atoms;
- $R^1$ represents an unreactive hydrocarbon radical optionally containing unreactive substituents and having a total of not more than 10 carbon atoms, preferably at least 2 carbon atoms and preferably not more than 7 carbon atoms, or is alkali metal, preferably potassium or sodium, ammonium, an amine cation, or hydrogen; and
- M is alkali metal, preferably potassium or sodium, ammonium, an amine cation, or hydrogen.

R and $R^1$ may each for example represent an alkyl group containing up to 7 carbon atoms, an aryl or substituted aryl group or an aralkyl group.

The film-forming composition for the coating layer may be applied as an aqueous latex, dispersion or solution, as a solution in an organic solvent or in a hydrosol. The composition is preferably applied from an aqueous medium especially as an aqueous latex.

The phosphate ester component of the coating composition has been found to render the film anti-static as determined by a surface resistivity of less than $1 \times 10^{13}$ ohms/square measured at 50% relative humidity and 20° C. and a propensity to electrostatic charge accumulation assessed as a tendency to sparking after at least 250 roller contacts in the test described below. The phosphate ester has been found to exhibit a useful and beneficial combination of properties in the process defined above.

Thus, the phosphate ester may be added to aqueous coating compositions such as aqueous latices without causing the copolymer to coagulate or interfering with its film-forming properties, or the cross-linking, as described below, of the preferred copolymers. The phosphate esters may also be subjected to the temperatures which are normally applied to the film after application of the coating composition for instance for orientation and possibly heat setting without volatilisation, decomposition, absorption into the thermoplastics film or chemical reaction with the film or the copolymer component of the coating composition.

The self-supporting thermoplastics film may be produced from any thermoplastics material which is capable of molecular orientation such as a polymer or copolymer of an olefine, e.g. polypropylene, or a synthetic linear polyester which may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-biphenyldicarboxylic acid, hexahydro-terephthalic acid or 1,2-bis-p-carboxyphenoxyethane, optionally with a monocarboxylic acid, such as pivalic acid, with one or more glycols, e.g. ethylene glycol, 1,3-propanediol, 1,4-butanediol, neopentyl glycol and 1,4-cyclohexanedimethanol. Polyethylene terephthalate films are particularly preferred especially those films which have been biaxially oriented by stretching in sequence in two mutually perpendicular directions typically at temperatures in the range 78° to 125° C. and preferably heat set typically at temperatures in the range 150° to 250° C., e.g. as described in GB patent specification 838 708.

The copolymeric component of the coating composition preferably comprises a copolymer derived essentially from comonomers comprising alkyl esters of acrylic and/or methacrylic acids and/or derivatives thereof including the acids; comonomers other than acrylic or methacrylic comonomers may optionally be present in minor amounts provided they have no substantial influence upon the essential properties relating to the acrylic and methacrylic comonomers. Such optional comonomers may comprise vinyl esters, styrene, butadiene, ethylene, maleate esters, or esters of itaconic acid. Suitable acrylic and methacrylic comonomers include especially alkyl esters in which the alkyl group contains up to 10 carbon atoms of which ethyl acrylate and methyl methacrylate are particularly preferred. Additional comonomers besides esters such as methyl methacrylate and ethyl acrylate may comprise acrylic and methacrylic acids, amides of acrylic and methacrylic acid including acrylamide, methacrylamide and derivatives thereof in which at least one of the amino hydrogen atoms is replaced by a group such as —CH$_2$OH or —CH$_2$OR in which R is an alkyl group such as methyl or ethyl, glycidyl methacrylate, glycidyl acrylate, hydroxyalkyl methacrylates and/or nitriles such as acrylonitrile and methacrylonitrile. Such additional comonomers may be employed in amounts in the range 2–25 mole %.

The copolymeric component of the coating composition is preferably cross-linkable and may be cross-linked after application to the thermoplastics film and conveniently during any stretching operation effected after coating and/or heat setting, the cross-linking reaction desirably being initiated at the temperatures prevailing during stretching and/or heat setting. Cross-linking of the copolymeric component may be achieved by the self-cross-linking of functional groups contained in the structure of the copolymer or by the addition of a cross-linking agent which is reactive with cross-linkable functional groups in the copolymer. Cross-linking of the copolymer improves the adhesion of the coating layer to thermoplastics films, especially polyester films such as polyethylene terephthalate films. Accordingly, the copolymer preferably contains cross-linkable functional groups, such as hydroxyl, carboxyl, amide, amine, nitrile and epoxy groups derived from suitable comonomers containing such groups.

A preferred group of copolymers comprises both ethyl acrylate and methyl methacrylate, which in combination form a major proportion of the copolymer, e.g. copolymers wherein the ethyl acrylate and methyl methacrylate together are from 80 to 98 mole % of the comonomeric mixture, especially copolymers derived from 15 to 50 mole % of ethyl acrylate and 40 to 80 mole % of methyl methacrylate and 2 to 25 mole % of additional comonomer containing cross-linkable functional groups. Preferred copolymers comprise copolymers of ethyl acrylate, methyl methacrylate and methacrylamide and/or acrylamide in approximate respective monomeric proportions of 45–50, 45–50 and 3–5 mole %. Anti-static coating layers comprising these preferred copolymers are particularly suitable for application to synthetic linear polyester films especially polyethylene terephthalate films.

A preferred group of acrylic or methacrylic copolymers comprises copolymers of methacrylamide or acrylamide or N-hydroxymethyl, N-methoxymethyl or N-ethoxymethyl derivatives thereof with one or more alkyl esters of acrylic or methacrylic acid in which the alkyl group contains up to 10 carbon atoms. The group of copolymers comprising ethyl acrylate, methyl methacrylate and methacrylamide or acrylamide as described above and especially comprising the preferred comonomeric molar proportions stated above are particularly suitable for cross-linking. Cross-linking of these copolymers may be accomplished by means of a cross-linking agent added to the coating composition such as epoxy resins, aziridinyl resins, alkyd resins and/or condensation products of an amine, e.g. melamine, diazine, urea, cyclic ethylene urea, cyclic propylene urea, thiourea, cyclic ethylene thiourea, alkyl melamines, aryl melamines, benzo-guanamines, guanamines, alkyl guanamines and aryl guanamines, with an aldehyde, e.g. formaldehyde, which is reactive with the cross-linkable functional groups in the copolymer.

The methylol derivatives of such amines are especially preferred. A useful condensation product is that of melamine with formaldehyde. The condensation product may optionally be alkoxylated. The cross-linking agent may be used in amounts of up to 25% by weight based on the weight of the copolymer. A catalyst may be employed to accelerate the cross-linking action of the cross-linking agent. Suitable catalysts for cross-linking amine/aldehyde condensates such as melamine/formaldehyde include ammonium chloride, ammonium nitrate, ammonium thiocyanate, ammonium dihydrogen phosphate, ammonium sulphate, diammonium hydrogen phosphate, para-toluene sulphonic acid, maleic acid stabilised by reaction with a volatile base, and morpholinium para-toluene sulphonate. Other suitable catalysts for the cross-linking action comprise acid phosphate esters including the partial salts, especially sodium, potassium, ammonium or amine salts, of acid phosphate esters. Accordingly, partial salts of the acidic phosphate ester precursors of the phosphate ester structures defined above are useful in effecting the cross-linking action.

Another preferred group of acrylic or methacrylic copolymers comprises copolymers of glycidyl methacrylate and/or glycidyl acrylate with one or more alkyl esters of acrylic or methacrylic acid in which the alkyl group contains up to 10 carbon atoms and especially ethyl acrylate and methyl methacrylate which are preferably both present in the copolymer. Suitable copolymers may be derived from 3 to 25 mole % of glycidyl methacrylate or glycidyl acrylate, 35 to 95 mole % of the ester or esters of acrylic and methacrylic acids, and optionally 1 to 60 mole % of acrylonitrile and/or 0.5 to 15 mole % of an acrylic or methacrylic comonomer having a functional hydrophilic group, such as a hydroxyalkyl methacrylate, e.g. hydroxyethyl methacrylate. The comonomers may optionally include small amounts, e.g. up to 3 mole %, of acrylic and/or methacrylic acids. Preferred copolymers comprise from 30 to 50 mole % of the esters of acrylic acid and from 40 to 60 mole % of the esters of methacrylic acid plus acrylonitrile. A suitable copolymer may be derived from 5 to 10 mole % of glycidyl methacrylate or glycidyl acrylate, 1 to 5 mole % of an acrylic or methacrylic comonomer having a functional group, e.g. hydroxyalkyl methacrylate, up to 40 mole % of acrylonitrile and 50 to 80 mole % of acrylic and/or methacrylic acid ester(s), a particularly effective copolymer being a copolymer of 7 mole % of glycidyl methacrylate, 1 mole % of hydroxyethyl methacrylate, 35 mole % of ethyl acrylate, 21 mole % of methyl methacrylate and 36 mole % of acrylonitrile. An alternative copolymer may be derived from 5 to 13 mole % of glycidyl methacrylate or glycidyl acrylate, 1 to 8 mole % of acrylic or methacrylic comonomer having a functional group, e.g. hydroxyethyl methacrylate and 80 to 94 mole % of acrylic and/or methacrylic acid ester(s), a preferred copolymer being a copolymer of 8 mole % of glycidyl methacrylate, 3 mole % of hydroxyethyl methacrylate, 40 mole % of ethyl acrylate and 49 mole % of methyl methacrylate. The copolymer may be self cross-linked or, when the proportion of acrylonitrile in the copolymer is less than 20 mole %, provided the proportions of glycidyl methacrylate or glycidyl acrylate and the acrylic or methacrylic comonomer having a functional hydrophilic group, when present, are less than 15 mole % and 10 mole % respectively, cross-linked with an added cross-linking agent, preferably in the presence of a catalyst, e.g. as described in the preceding paragraph.

Preferred alkyl groups for use as R and $R^1$ in the defined phosphate ester structure preferably comprise 1 to 5 carbon atoms and are most preferably selected from ethyl, n-propyl, iso-propyl, n-butyl, iso-butyl and tert-butyl, the preferred aryl or substituted aryl groups for use as R and $R^1$ are phenyl which may be substituted with one or more alkyl groups containing up to 10 carbon atoms (especially methyl) and/or one or more halogen (especially chlorine) atoms, and the preferred aralkyl group is benzyl. Long chain alkyl groups containing more than 7 carbon atoms, if present as R and $R^1$, tend to modify undesirably the coating and film-forming properties of the coating composition thereby resulting in coating quality defects such as non-uniformities and streaks.

In the above defined phosphate ester structures which contain both R and $R^1$ groups as hydrocarbon radicals, these groups may be the same or different.

Anti-static properties are provided by the presence in the coating layer of the phosphate ester which may comprise one compound or a mixture of two or more compounds chosen from the structures defined above. Such esters may be present in the free acid form or in the partially or completely neutralized forms as sodium or potassium salts. The phosphate ester employed in the coating composition may comprise one or more of the defined phosphate esters, for example, those selected from the salts of monoalkyl acid esters, dialkyl acid esters, monoaryl acid esters, diaryl acid esters and alkyl aryl acid esters.

Ethyl phosphate ester salts have been found to provide a particularly effective balance of properties. Such salts may be derived from diethyl hydrogen phosphate or ethyl dihydrogen phosphate or a mixture thereof.

Amounts of the phosphate ester, expressed as the weight of the corresponding unneutralized acid phosphate ester and based upon the solids content of the coating composition, in the range 12.5 to 100%, and preferably 50 to 75%, by weight provide effective anti-static properties in dried coating layers having a thickness in the range 0.01 to 0.1 μm, preferably 0.01 to 0.5 μm, after completion of the molecular orientation of the thermoplastics film by stretching. The preferred amounts of the phosphate ester are in the range 53 to 67% by weight based upon the weight of the copolymer, such amounts being especially effective with cross-linked copolymers comprising ethyl acrylate/methyl methacrylate/acrylamide particularly in the comonomeric proportions of about 48/48/4 mole %.

The thermoplastics film may be molecularly oriented by stretching using conditions already known in the art. Whilst it is possible to impart uniaxial orientation by stretching in one direction only, it is preferred to biaxially orient the film by stretching in two mutually perpendicular directions in order to achieve a satisfactory combination of mechanical and physical properties. Biaxial orientation may be achieved by simultaneous or sequential stretching in the two mutually perpendicular directions. Simultaneous stretching may be effected by extruding the thermoplastics film in tubular form and stretching by inflating the tube by internal gas pressure and withdrawing the tube from the zone of inflation more rapidly than it is introduced to the zone. In such a simultaneous stretching process, the coating composition is preferably applied to the film before stretching is commenced. Sequential stretching may be effected by extruding the thermoplastics film in flat form and stretching the film first in one direction and then in the other mutually perpendicular direction. Generally, it is preferred to stretch the film firstly in the longitudinal direction, i.e. the direction of passage through the stretching machine, and then in the transverse direction. The stretched films may also be dimensionally stabilised by heat-setting under dimensional restraint using conditions already known in the art. As indicated above, the preferred thermoplastics films are produced from polyethylene terephthalate by sequential biaxial orientation and heat setting, e.g. as described in GB patent No. 838 708.

Films oriented by sequential stretching may be coated with the coating composition, preferably as an aqueous latex, either before stretching in the first direction of stretching or at a stage intermediate the stretching in the first direction and stretching in the second direction. It is preferred according to this invention that the coating composition should be applied to the film between the two stretching operations. Such a sequence of stretching and coating is especially preferred for the production of anti-static primed linear polyester films such as polyethylene terephthalate films which are preferably firstly stretched in the longitudinal direction over a series of rotating rollers, coated with the latex and then stretched transversely in a stenter oven preferably followed by heat-setting.

According to this invention, the coating composition is applied to the surface of the thermoplastics film before the commencement of or during the molecular orientation. The essential properties of the phosphate ester have been found to be unaffected by the elevated temperatures used for stretching and, when employed, heat setting the film after the application of the coating composition, and especially the temperatures conventionally employed for stretching and heat setting polyethylene terephthalate films for conventional time durations, e.g. those typically employed in commercial processes for stretching and heat setting polyethylene terephthalate films, and also to retain beneficial anti-static properties after subjection to such temperatures. However, prolonged exposure to elevated temperatures especially the temperatures at which heat setting is effected have been found to result in a diminution of the anti-static properties of the coated film. Accordingly, dwell times for heat setting at 240° C. should not exceed 45 seconds and preferably should not exceed 25 seconds. Longer dwell times can be tolerated at lower heat-setting temperatures without adversely affecting the anti-static properties and can be determined experimentally.

Coating layers comprising partial salts of an acidic phosphate ester (i.e. incompletely neutralized materials), especially of an acidic alkyl phosphate ester, exhibit a useful combination of anti-static properties, coat quality and adhesion to superimposed layers such as reprographic lacquers. Partial salts may be obtained by partially neutralizing the acidic alkyl phosphate ester, e.g. with potassium hydroxide or sodium hydroxide, in an aqueous medium. When the copolymer component of the coating composition is cross-linkable in the presence of an acidic alkyl phosphate ester, a satisfactory combination of properties can be obtained when the aqueous partially neutralized acidic phosphate ester, preferably an alkyl phosphate ester, has a pH in the range 1.7 to 8.0 (in the absence of any other materials that might influence pH) prior to addition to the acrylic or methacrylic copolymer component. At a pH less than 1.7 the amount of potassium or sodium ion in the partial salt is generally insufficient to provide a substantial reduction in surface resistivity although the anti-static properties are modified to the extent that the propensity to accumulate electrostatic charges is reduced especially at relative humidities of at least 30% at 20° C. A pH exceeding 8.0 does in fact provide extremely effective anti-static protection, namely surface resistivities of about $1 \times 10^8$ ohms/square at 50% relative humidity and 20° C. and about $1 \times 10^9$ ohms/square at 30% relative humidity and 20° C. together with a negligible propensity to charge accumulation. However, the cross-linking activity of cross-linkable copolymers and cross-linkable agents, namely cross-linking agents which cross-link under acidic conditions such as amine/aldehyde condensation products, may be adversely inhibited above pH 8.0, thereby diminishing the adhesion of coating layer to the film, as described below. The preferred range of pH for aqueous salts of acidic phosphate esters, e.g. of acid alkyl phosphate esters, prior to their addition to a cross-linkable copolymer and, if employed, a cross-linking agent, which may be required to promote the adhesion between the coating layer and the film, is less than 8 and especially 1.7 to 5. It will be appreciated that coating copolymers which are not cross-linked, or do not require to be cross-linked under acidic conditions, may be used in conjunction with added aqueous partial phosphate ester salts having a pH exceeding 8.0 since the resulting anti-static properties are very satisfactory.

It will be appreciated that the aqueous or organic medium of the coating composition is normally dried at the temperatures applied to the coated film for stretching and/or heat setting. When a cross-linkable composition is employed, the cross-linking reaction also occurs at this stage although predominantly during heat setting because the rate of cross-linking is more rapid at the heat-setting temperatures which are higher than those used for stretching. As indicated above, the cross-linking of certain cross-linkable coating compositions is inhibited when the added aqueous acidic alkyl phosphate esters have a pH exceeding 8.0. Aqueous cross-linkable compositions whose cross-linking activity has been found to be inhibited at a pH exceeding 8.0 comprise those cross-linkable compositions described above which include a copolymer containing cross-linkable functional groups and a condensation product of an amine and an aldehyde. The cross-linking activity of such a composition by reaction between the condensation product with the cross-linkable functional groups of the copolymer and the self-cross-linking action of the condensation product itself is accelerated to an acceptable rate in the process of the invention when catalyzed under acidic conditions. The addition of an aqueous partial salt of an acidic phosphate ester such as an acidic alkyl phosphate ester having a pH in the preferred range 1.7 to 5 to such a cross-linkable composition establishes the desired acidic conditions for cross-linking without necessitating the addition of a special cross-linking catalyst. However, an adverse consequence of this effect is that premature cross-linking of the composition leading to coagulation and hence difficulties in coating has been observed. This instability of the coating composition could be avoided by the addition of a highly, e.g. more than 90%, neutralised acidic phosphate ester, preferably an alkyl phosphate ester, thereby providing a highly alkaline latex and the inclusion of an additional cross-linking catalyst. However, this is generally impracticable since excessive amounts of catalyst would be required to compensate for relatively high amounts of phosphate ester, which are preferably in the range 12.5 to 100% and especially 53 to 67% by weight based upon the weight of the copolymer.

It has been discovered that the instability of aqueous cross-linkable coating compositions can be avoided by maintaining a pH exceeding 7 until the composition has been applied to the film and preferably until molecular orientation by stretching has been completed. Therefore, according to a preferred embodiment of the invention stabilisation against premature cross-linking is achieved by rendering the aqueous phosphate ester salt alkaline, preferably to a pH in the range 7.5 to 10, by treatment with a volatile base prior to its additional to the other components of the coating composition, namely the cross-linkable components such as a cross-linkable copolymer and the cross-linking condensation product. The base is chosen to be volatile at the temperatures prevailing during the stretching and/or, if employed, heat-setting steps after the application of the coating latex, e.g. ammonium hydroxide, triethylamine or morpholine. Volatilization of the base at the stretching and/or heat setting temperatures restores the desired acidic conditions for cross-linking thereby enabling the cross-linking reaction to proceed.

The coated thermoplastics films produced by the process of the invention have excellent anti-static properties represented by a surface resistivity of less than $1 \times 10^{13}$ ohms/square at 50% relative humidity and a low propensity to electrostatic charge accumulation, i.e. the films reach a sparking potential after at least 250 roller contacts in the test described hereinafter. These anti-static properties are exhibited by films having cross-linked and uncross-linked coatings.

The coated thermoplastics films produced by the process of the invention have excellent handling properties on account of the anti-static properties provided by the coating layer and are suitable for continuous feeding through automatic film handling machinery, e.g. packaging machines and electrostatic copying machines, without snagging or interruption and in other end uses where anti-static properties are important, e.g. montage assemblies and printing films.

The cross-linked coatings, in addition to providing anti-static properties, also exhibit strong adhesion to the thermoplastics film and to coatings superimposed upon the surface of the cross-linked coating. Accordingly such cross-linked coatings function as adhesion-promoting priming layers or subbing layers for superimposed coatings such as reprographic lacquers comprising, for example, cellulose acetate butyrate, cellulose acetate propionate, acrylic resins and partially or completely hydrolysed polyvinyl acetate and optionally containing inorganic filler particles such as pigments and matting agents and/or light-sensitive diazonium salts; light-sensitive photographic emulsions; printing inks; metallising layers; heat-sealable layers; and moisture- and gas-impermeable barrier layers. It has been discovered surprisingly that the presence of the alkyl phosphate ester salt serves to improve the adhesion of the coating layer to superimposed hydrophilic lacquers, especially lacquers comprising partially or completely hydrolyzed polyvinyl acetate.

The anti-static protection of the films produced according to the process of the invention enables the films to be transported through electrostatic copying machines effectively and without interruption. Furthermore, the cross-linked or uncross-linked coating layers are receptive to electrostatic toner images and in particular such images have sufficient adhesion and durability for use for overhead projection.

The invention is further illustrated by the following examples.

The following test methods were used to evaluate the products of the examples.

1 Reprographic lacquer adhesions (a) Cellulose acetate butyrate lacquer (CAB)

The test was conducted using a lacquer comprising (in parts by weight) 15 parts cellulose acetate butyrate of "3 second" grade dissolved in a mixture of 42.5 parts methyl ethyl ketone and 42.5 parts methyl isobutyl ketone, the lacquer having a viscosity determined as 6.5 to 7.5 seconds at 25° C. using a Gardner-Holdt viscometer. The lacquer was applied to the latex-coated surface of the film by means of a wire-wound bar, a KCC Bar No. 5 manufactured by RK Print-Coat Instruments Ltd of Royston, Hertfordshire, England, cured in an oven for 1 minute at 120° C. and then lightly scored with a cross-hatch pattern by means of eight blade edges set at a spacing of 3 mm. A strip of adhesive tape ('Scotch' Paklon tape 2PHC) was stuck to the cross-hatched area and then ripped from the film so as to exert maximum stress on the lacquer-prime interface. The amount of lacquer remaining in the cross-hatched area was assessed and the "lacquer adhesion" expressed as a percentage of this amount, i.e. no lacquer removed = 100% adhesion, all lacquer removed = 0% adhesion with intermediate adhesion values being assessed in terms of the proportion of lacquer area remaining adhered to the film. The test was repeated four times on different areas of the film and an average adhesion value calculated, these average values being noted in Table 2. Adhesion values of at least 90% are generally acceptable for commercial reprographic uses.

(b) Partially hydrolyzed polyvinyl acetate lacquer (Partially hydrolyzed PVAc)

The test was conducted using a lacquer comprising a solution of partially hydrolyzed polyvinyl acetate in industrial methylated spirits. The lacquer was applied to the latex-coated surface of the film by means of a wire-wound bar (a KCC Bar No. 5) and cured in an oven for 60 seconds at 120° C. Adhesion was assessed by adhering a strip of adhesive tape ('Scotch' Paklon tape 2PHC), about 15 cm long, to the lacquered surface. The lacquered film was firmly anchored along the top edge but otherwise free to move and the adhesive tape was rapidly peeled from the lacquered film downwardly. The amount of lacquer remaining on the film in the area tested with the adhesive tape was assessed. More than 90% lacquer remaining in the test area represents satisfactory adhesion.

(c) Fully hydrolyzed polyvinyl acetate lacquer (Fully hydrolyzed PVAc)

The test was conducted using a lacquer comprising 5% by weight of polyvinyl alcohol (commercially available as 'Alcotex' A) in water which was applied to the latex-coated surface of the film by means of a wire-wound bar (a KCC Bar No. 5), cured in an oven for 60 seconds at 120° C. and tested with an adhesive tape by the procedure described above for partially hydrolyzed polyvinyl acetate adhesion. More than 90% lacquer remaining in the test area is regarded as being satisfactory.

(d) Cellulose acetate propionate lacquer (CAPr)

The test was conducted using a diazo-sensitisable lacquer comprising (in parts by weight) 95 parts cellulose acetate propionate and 5 parts polyvinyl acetate and silica particles in a solvent mixture comprising a ketone, toluene and a high boiling point organic solvent. The lacquer was applied to the latex-coated surface of the film by means of a wire-wound bar (a KCC Bar No. 5) and cured in an oven for 30 seconds at 120° C. Adhesion was assessed by the adhesive tape test described in (b) above concerning partially hydrolyzed polyvinyl acetate lacquer.

2 Propensity to electrostatic charge accumulation

This test determines the rate at which electrostatic charge accumulates on the film as a result of contact with a series of rollers. The results are expressed as the number of roller contacts required to reach a sparking potential since this is one of the most practical considerations when film is being transported through a machine in a solvent laden atmosphere. The test equipment comprises a series of five anodized aluminium rollers contained in a controlled environment round which a loop of the film under test was passed. During each circuit of the loop the film contacted each of the five rollers and the film was passed round the circuit until sparks were visible in a darkened room, the number of contacts with the set of rollers being noted, or until the film had made 600 roller contacts when the test was terminated. Sparking potentials reached in less than 250 roller contacts at 30% relative humidity and 20° C. could not be regarded as having anti-static properties.

COMPARATIVE EXAMPLE 1

An aqueous latex of the following formulation was prepared immediately prior to application to the surface of a film of polyethylene terephthalate:

| | |
|---|---|
| Cross-linkable polymer comprising 80% by weight of copolymer of 48 mole % ethyl acrylate, 48 mole % methyl methacrylate and 4 mole % acrylamide and 20% by weight of a ethylated condensate of melamine and formaldehyde | 4 g |
| Wetting agent commercially available as 'Synperonic' N (a condensation product of ethylene oxide and an alkyl phenol) | 0.25 g |
| Ammonium nitrate catalyst | 0.014 g |
| Water | 100 ml |

A flat film of polyethylene terephthalate was melt-extruded and quenched to the amorphous state on a cooled rotating drum. The quenched film was stretched about 3.0 times in the direction of extrusion over sets of slow and fast rotating rollers at a temperature of about 80° C.

The latex was applied to both sides of the uniaxially oriented film by an off-set gravure coating technique and the coated film stretched transversely about 3.0 times at about 90° C. followed by heat setting under dimensional restraint to provide a uniform coating on each side of the film approximately 0.025 μm thick. During the heat-setting process the coated film was subjected to a maximum temperature of about 235° C. for approximately 15 seconds.

The resulting coated film was tested for reprographic lacquer adhesion and propensity to electrostatic charge accumulation by the test procedures described above and for surface resistivity at 30% and 50% relative humidities at 20° C. with the results shown in Table 2.

The adhesions of a drafting lacquer comprising a thermosetting acrylic resin, silica particles and a mixed organic solvent to the coating layer was also assessed by applying the lacquer to the coating layer by the general procedure described above in the test for cellulose acetate butyrate lacquer adhesion. The adhesion of the lacquer to the coating layer was assessed by the general procedure described above in relation to partially hydrolyzed polyvinyl acetate lacquer. The lacquer exhibited excellent adhesion and completely resisted removal of the adhesive tape.

The adhesion of hydrophobic lacquers, i.e. cellulose acetate butyrate, cellulose acetate propionate and acrylic lacquers to the coating layer, was excellent but the adhesion of the hydrophilic lacquers based on completely or partially hydrolyzed polyvinyl acetate was poor. The film also had very poor anti-static performance in that the surface resistivity was greater than $10^{19}$ ohms/square at 50% relative humidity and 20° C. and the propensity to accumulate static charges was so great that a sparking potential was reached after only 5 roller contacts at 30% relative humidity.

EXAMPLE 1

Comparative Example 1 was repeated but with a modified latex containing in addition to the ingredients noted in Comparative Example 1, 4 g of ethyl acid phosphate in free acid form (commercially available from Warwick Chemical Limited, and believed to be a mixture of mono- and di-ethyl phosphates in the approximate respective molar ratios 60%:40%) diluted with 12 ml of water and neutralized to pH 4.5 with a 10% weight/volume potassium hydroxide solution as an anti-static salt and which was further neutralized to pH 9.5 by the addition of dilute aqueous ammonium hydroxide solution to stabilize the latex against premature cross-linking. To this solution was added 0.25 g of a surfactant of 'Synperonic' N and the volume made up to 40 ml with water before addition to the latex. The thickness of each of the dried priming layers after stretching and heat setting was about 0.038 μm.

The resulting coated film was tested for lacquer adhesion and for electrostatic performance with the results shown in Table 2. The adhesion of a thermosetting acrylic lacquer was also assessed, the lacquer being applied and tested as described in Comparative Example 1. The presence of anti-static salt in the coating latex did not influence the adhesion to this lacquer, the adhesions remaining excellent. The adhesion of the hydrophobic types of lacquers was excellent and in contrast to Comparative Example 1 the adhesion to the hydrophilic lacquers based on hydrolyzed polyvinyl acetate was also excellent. The film showed no propensity to accumulate charges, had a very low surface resistivity and would not reach a sparking potential even at 30% relative humidity and 20° C.

EXAMPLE 2

An aqueous coating latex of the following formulation was prepared immediately prior to application to the surface of a film of polyethylene terephthalate:

| | |
|---|---|
| Cross-linkable polymer comprising 80% by weight of copolymer of 48 mole % ethyl acrylate, 48 mole % methyl methacrylate and 4 mole % acrylamide and 20% by weight of a ethylated condensate of melamine and formaldehyde | 4 g |
| Wetting agent commercially available as 'Synperonic' N (a condensation product of ethylene oxide and an alkyl phenol) | 0.5 g |
| Ethyl acid phosphate (as used in Example 1) neutralized to pH 4.5 with potassium hydroxide solution as anti-static salt (solids content before neutralization) | 2.5 g |
| Ammonium para-toluene sulphonate catalyst | 0.07 g |
| Water | 100 ml |

The above latex was further neutralized to pH 9.5 by the addition of triethylamine.

The latex was applied to a polyethylene terephthalate film by the procedure described in Comparative Example 1 to provide dried coating layer thicknesses of about 0.03 μm.

The resulting coated film was found to have excellent reprographic lacquer adhesion and anti-static performance, the results being shown in Table 2. Additionally, when coated with and tested for adhesion to a thermosetting acrylic lacquer as described in Comparative Example 1, the adhesions were found to be excellent and resisted removal by the adhesive tape during testing.

EXAMPLE 3

Example 2 was repeated with the exception that the ethyl phosphate ester salt of the coating latex was prepared by neutralizing ethyl acid phosphate to pH 2.5 (instead of pH 4.5) with potassium hydroxide followed by further neutralization to pH 9.5 by the addition of dilute aqueous ammonium hydroxide solution and the dried coating layer had thicknesses of about 0.025 μm.

The resulting coated film was found to have excellent reprographic lacquer adhesion and anti-static performance, the results being shown in Table 2. Also when coated with and tested for adhesion to a thermosetting acrylic lacquer as described in Comparative Example 1, the adhesions were found to be excellent and resisted removal by the adhesive tape during testing.

EXAMPLES 4 TO 35

Coating latices of the general formulation described in the preceding examples were applied to polyethylene terephthalate films using the conditions described in the preceding examples with the exception that the formulation of the coated latices and conditions were modified as shown in Table 1. The coated films were tested with the results shown in Table 2. Adhesions to reprographic lacquers applied and tested as described in Comparative Example 1 were found to be excellent.

The ethyl phosphate ester salts used in Examples 4 to 23, 34 and 35 were prepared by neutralizing ethyl acid phosphate in free acid form (commercially available from Warwick Chemical Limited, and believed to be a mixture of mono- and di-ethyl phosphates in the approximate molar ratio 60%:40%) with potassium hydroxide or sodium hydroxide and stabilization by the addition of a volatile base generally in the manner described in Example 1.

The alkyl phosphate ester salts used in Examples 24 to 33 were prepared in the laboratory as mixtures of the mono- and di-acid phosphate esters by the reaction of phosphorus pentoxide with the appropriate alcohol. The phosphate esters were adjusted to the pH stated in Table 1 using a 10% by weight aqueous potassium hydroxide solution and then adjusted to pH 8.0 using dilute ammonium hydroxide solution. The solids content of this solution was adjusted to 10% weight/volume (g/ml) before admixture with cross-linkable polymer.

In the case of Example 5 the anti-static salt was prepared by neutralizing ethyl acid phosphate (as used in Example 1) with sodium hydroxide to a pH of 4.5.

The amount of anti-static salt employed in Examples 6 and 7, namely 0.5 g, was not sufficient to produce the dramatic improvements in the adhesion of the hydrophilic lacquers based on polyvinyl acetate achieved in the other examples although the anti-static performance was satisfactory.

EXAMPLE 36

An aqueous coating latex of the following formulation was prepared immediately prior to application to the surface of a film of polyethylene terephthalate:

| | |
|---|---|
| 'Primal' E1018 (a commercially available cross-linkable copolymer possibly containing hydroxyl groups: analysis indicates 67/33 mole % methyl methacrylate/butyl acrylate copolymer) | 4 g |
| Melamine formaldehyde resin (commercially available as 'Uformite' MM83 having a nominal solids content of 80 g/100 ml) | 0.8 g |
| Wetting agent commercially available as 'Synperonic' N | 0.5 g |
| Ethyl acid phosphate (as used in Example 1) neutralized to pH 4.5 with potassium hydroxide (solids content before neutralization) | 2.5 g |
| Ammonium nitrate | 0.014 g |
| Water | 100 ml |

The above latex was neutralized to pH 9.5 with dilute ammonium hydroxide and applied to a polyethylene terephthalate film by the procedure described in Comparative Example 1 to provide a dried coating of 0.025 μm.

The resulting primed film had excellent reprographic lacquer adhesion and anti-static performance when tested by the procedures described above, the results being shown in Table 2. Adhesions to reprographic lacquers applied and tested as described in Comparative Example 1 were found to be excellent.

Table 1 records certain characteristics of the coating latices and conditions used in Comparative Example 1 and Examples 1 to 36 and Table 2 records the resulting lacquer adhesions and anti-static properties.

TABLE 1

| Example No. | Anti-static salt and amount | Anti-static salt neutralization pH | Stabilizing base for anti-static salt and pH | Catalyst and amount | Coat thickness | Maximum temperature and time for heat setting |
|---|---|---|---|---|---|---|
| Comparative Example 1 | — | — | — | Ammonium nitrate 0.014 g | 0.025 μm | 235° C. 15 seconds |
| 1 | Potassium ethyl phosphate 4 g | 4.5 | Ammonium hydroxide 9.5 | Ammonium nitrate 0.014 g | 0.038 μm | 235° C. 15 seconds |
| 2 | Potassium ethyl phosphate 2.5 g | 4.5 | Triethyl amine 9.5 | Ammonium p-toluene sulphonate 0.07 g | 0.03 μm | 235° C. 15 seconds |
| 3 | Potassium ethyl phosphate 2.5 g | 2.5 | Triethyl amine 9.5 | Ammonium p-toluene sulphonate 0.07 g | 0.025 μm | 235° C. 15 seconds |
| 4 | Potassium ethyl phosphate 2.5 g | 7.5 | Ammonium hydroxide 9.5 | Ammonium p-toluene sulphonate 0.07 g | 0.025 μm | 235° C. 15 seconds |
| 5 | Sodium ethyl phosphate 2.5 g | 4.5 | Triethyl amine 9.5 | Ammonium p-toluene sulphonate 0.07 g | 0.03 μm | 235° C. 15 seconds |
| 6 | Potassium ethyl phosphate 0.5 g | 4.5 | Triethyl amine 9.5 | Ammonium p-toluene sulphonate 0.07 g | 0.03 μm | 235° C. 15 seconds |
| 7 | Potassium ethyl phosphate 0.5 g | 4.5 | Triethyl amine 9.5 | Ammonium p-toluene sulphonate 0.07 g | 0.03 μm | 220° C. 15 seconds |
| 8 | Potassium ethyl phosphate 4 g | 4.5 | Ammonium hydroxide 9.5 | Ammonium nitrate 0.014 g | 0.038 μm | 235° C. 15 seconds |
| 9 | Potassium ethyl phosphate | 1.7 | Ammonium hydroxide 8.0 | Ammonium nitrate 0.014 g | 0.036 μm | 225° C. 10 seconds |

TABLE 1-continued

| Example No. | Anti-static salt and amount | Anti-static salt neutralization pH | Stabilizing base for anti-static salt and pH | Catalyst and amount | Coat thickness | Maximum temperature and time for heat setting |
|---|---|---|---|---|---|---|
| 10 | Potassium ethyl phosphate 2.5 g | 1.7 | Ammonium hydroxide 8.0 | Ammonium nitrate 0.014 g | 0.036 μm | 225° C. 10 seconds |
| 11 | Potassium ethyl phosphate 4.0 g | 4.5 | Ammonium hydroxide 8.0 | Ammonium nitrate 0.014 g | 0.036 μm | 225° C. 10 seconds |
| 12 | Potassium ethyl phosphate 2.5 g | 4.5 | Ammonium hydroxide 8.0 | Ammonium nitrate 0.014 g | 0.036 μm | 225° C. 10 seconds |
| 13 | Potassium ethyl phosphate 4.0 g | 1.7 | Ammonium hydroxide 8.0 | Ammonium nitrate 0.014 g | 0.024 μm | 225° C. 10 seconds |
| 14 | Potassium ethyl phosphate 2.5 g | 1.7 | Ammonium hydroxide 8.0 | Ammonium nitrate 0.014 g | 0.024 μm | 225° C. 10 seconds |
| 15 | Potassium ethyl phosphate 4.0 g | 4.5 | Ammonium hydroxide 8.0 | Ammonium nitrate 0.014 g | 0.024 μm | 225° C. 10 seconds |
| 16 | Potassium ethyl phosphate 2.5 g | 4.5 | Ammonium hydroxide 8.0 | Ammonium nitrate 0.014 g | 0.024 μm | 225° C. 10 seconds |
| 17 | Potassium ethyl phosphate 4.0 g | 1.7 | Ammonium hydroxide 8.0 | Ammonium nitrate 0.014 g | 0.036 μm | 225° C. 10 seconds |
| 18 | Potassium ethyl phosphate 2.5 g | 1.7 | Ammonium hydroxide 8.0 | Ammonium nitrate 0.014 g | 0.036 μm | 225° C. 10 seconds |
| 19 | Potassium ethyl phosphate 4.0 g | 4.5 | Ammonium hydroxide 8.0 | Ammonium nitrate 0.014 g | 0.036 μm | 225° C. 10 seconds |
| 20 | Potassium ethyl phosphate 2.5 g | 4.5 | Ammonium hydroxide 8.0 | Ammonium nitrate 0.014 g | 0.036 μm | 225° C. 10 seconds |
| 21 | Potassium ethyl phosphate 4.0 g | 1.7 | Ammonium hydroxide 8.0 | Ammonium nitrate 0.014 g | 0.024 μm | 225° C. 10 seconds |
| 22 | Potassium ethyl phosphate 2.5 g | 4.5 | Ammonium hydroxide 8.0 | Ammonium nitrate 0.014 g | 0.024 μm | 225° C. 10 seconds |
| 23 | Potassium ethyl phosphate 4.0 g | 4.5 | Ammonium hydroxide 8.0 | Ammonium nitrate 0.014 g | 0.024 μm | 225° C. 10 seconds |
| 24 | Potassium isopropyl phosphate 2.5 g | 1.7 | Ammonium hydroxide 8.0 | Ammonium nitrate 0.014 g | 0.024 μm | 225° C. 10 seconds |
| 25 | Potassium isopropyl phosphate 4.0 g | 1.7 | Ammonium hydroxide 8.0 | Ammonium nitrate 0.014 g | 0.024 μm | 225° C. 10 seconds |
| 26 | Potassium isopropyl phosphate 2.5 g | 4.5 | Ammonium hydroxide 8.0 | Ammonium nitrate 0.014 g | 0.024 μm | 225° C. 10 seconds |
| 27 | Potassium isopropyl phosphate 4.0 g | 4.5 | Ammonium hydroxide 8.0 | Ammonium nitrate 0.014 g | 0.024 μm | 225° C. 10 seconds |
| 28 | Potassium isopropyl phosphate 2.5 g | 4.5 | Ammonium hydroxide 8.0 | Ammonium nitrate 0.014 g | 0.024 μm | 225° C. 10 seconds |

TABLE 1-continued

| Example No. | Anti-static salt and amount | Anti-static salt neutralization pH | Stabilizing base for anti-static salt and pH | Catalyst and amount | Coat thickness | Maximum temperature and time for heat setting |
|---|---|---|---|---|---|---|
| 29 | Potassium isopropyl phosphate 4.0 g | 4.5 | Ammonium hydroxide 8.0 | Ammonium nitrate 0.014 g | 0.024 μm | 225° C. 10 seconds |
| 30 | Potassium n-butyl phosphate 2.5 g | 1.7 | Ammonium hydroxide 8.0 | Ammonium nitrate 0.014 g | 0.036 μm | 225° C. 10 seconds |
| 31 | Potassium n-butyl phosphate 4.0 g | 1.7 | Ammonium hydroxide 8.0 | Ammonium nitrate 0.014 g | 0.036 μm | 225° C. 10 seconds |
| 32 | Potassium n-butyl phosphate 2.5 g | 4.5 | Ammonium hydroxide 8.0 | Ammonium nitrate 0.014 g | 0.036 μm | 225° C. 10 seconds |
| 33 | Potassium n-butyl phosphate 4.0 g | 4.5 | Ammonium hydroxide 8.0 | Ammonium nitrate 0.014 g | 0.036 μm | 225° C. 10 seconds |
| 34 | Potassium ethyl phosphate 2.5 g | 2.5 | Triethyl amine 7.5 | None | 0.036 μm | 220° C. 18 seconds |
| 35 | Potassium ethyl phosphate 2.5 g | 4.5 | Triethyl amine 7.5 | None | 0.036 μm | 220° C. 18 seconds |
| 36 | Potassium ethyl phosphate 2.5 g | 4.5 | Ammonium hydroxide 9.5 | Ammonium nitrate 0.014 g | 0.025 μm | 235° C. 10 seconds |

TABLE 2

| Example No. | Reprographic lacquer adhesions | | | | Surface resistivity ohms/square | | Propensity to electrostatic charge accumulation - number of roll contacts | |
|---|---|---|---|---|---|---|---|---|
| | CAB | Partially hydrolyzed PVAc | Fully hydrolyzed PVAc | CAPr | 30% relative humidity 20° C. | 50% relative humidity 20° C. | 30% relative humidity 20° C. | 50% relative humidity 20° C. |
| Comparative Example 1 | 100% | 0 | 0 | 100% | $>10^{19}$ | $>10^{19}$ | 5 | 10 |
| 1 | 99% | 100% | 100% | 100% | $1 \times 10^9$ | $1 \times 10^8$ | >600 | >600 |
| 2 | 100% | 100% | 100% | 100% | $5 \times 10^9$ | $1 \times 10^9$ | >600 | >600 |
| 3 | 100% | 100% | 100% | 100% | $6 \times 10^{12}$ | $4 \times 10^{10}$ | 300 | 450 |
| 4 | 95% | 97% | 98% | 98% | $1 \times 10^9$ | $1 \times 10^8$ | >600 | >600 |
| 5 | 100% | 100% | 100% | 100% | $8 \times 10^9$ | $6 \times 10^9$ | >600 | >600 |
| 6 | 100% | 70% | 60% | 100% | $7 \times 10^{12}$ | $5 \times 10^{11}$ | 350 | 500 |
| 7 | 100% | 75% | 70% | 100% | $6 \times 10^{11}$ | $4 \times 10^9$ | 550 | >600 |
| 8 | 96% | 100% | 100% | 98% | $1 \times 10^{11}$ | $3 \times 10^9$ | 400 | 550 |
| 9 | 100% | | | 100% | $1 \times 10^{12}$ | $1 \times 10^9$ | | |
| 10 | 100% | | | 99% | $1 \times 10^{11}$ | $1 \times 10^8$ | | |
| 11 | 100% | | | 100% | $1 \times 10^{12}$ | $5 \times 10^7$ | | |
| 12 | 100% | | | 100% | $1 \times 10^{12}$ | $1 \times 10^7$ | | |
| 13 | 90% | | | 90% | $1 \times 10^{12}$ | $5 \times 10^8$ | | |
| 14 | 100% | | | 100% | $1 \times 10^{11}$ | $1 \times 10^8$ | | |
| 15 | 100% | | | 100% | $1 \times 10^{12}$ | $1 \times 10^8$ | | |
| 16 | 100% | | | 100% | $1 \times 10^{12}$ | $1 \times 10^8$ | | |
| 17 | 100% | | | 100% | $1 \times 10^{13}$ | $1 \times 10^9$ | | |
| 18 | 50% | | | 90% | $1 \times 10^{11}$ | $1 \times 10^9$ | | |
| 19 | 100% | | | 100% | $1 \times 10^{11}$ | $1.5 \times 10^7$ | | |
| 20 | 100% | | | 100% | $1.5 \times 10^9$ | $1.5 \times 10^7$ | | |
| 21 | 99% | | | 100% | $1 \times 10^{12}$ | $1 \times 10^{10}$ | | |
| 22 | 100% | | | 100% | $1 \times 10^{11}$ | $1 \times 10^8$ | | |
| 23 | 100% | | | 100% | $1 \times 10^{11}$ | $1.5 \times 10^7$ | | |
| 24 | 80% | | | 80% | $>1 \times 10^{12}$ | $1 \times 10^9$ | | |
| 25 | 85% | | | 75% | $1 \times 10^{12}$ | $1 \times 10^9$ | | |
| 26 | 100% | | | 100% | $1 \times 10^{11}$ | $1 \times 10^8$ | | |
| 27 | 100% | | | 100% | $1 \times 10^{11}$ | $1.5 \times 10^7$ | | |
| 28 | 99% | | | 99% | $1 \times 10^{12}$ | $1 \times 10^9$ | | |
| 29 | 100% | | | 100% | $1 \times 10^{11}$ | $1 \times 10^8$ | | |

TABLE 2-continued

| Example No. | Reprographic lacquer adhesions | | | | Surface resistivity ohms/square | | Propensity to electrostatic charge accumulation - number of roll contacts | |
|---|---|---|---|---|---|---|---|---|
| | CAB | Partially hydrolyzed PVAc | Fully hydrolyzed PVAc | CAPr | 30% relative humidity 20° C. | 50% relative humidity 20° C. | 30% relative humidity 20° C. | 50% relative humidity 20° C. |
| 30 | 85% | | | 99% | $1 \times 10^{11}$ | $1 \times 10^{10}$ | | |
| 31 | 90% | | | 99% | $1 \times 10^{12}$ | $1.5 \times 10^{9}$ | | |
| 32 | 80% | | | 99% | $1 \times 10^{11}$ | $1.5 \times 10^{8}$ | | |
| 33 | 30% | | | 85% | $1 \times 10^{12}$ | $1 \times 10^{8}$ | | |
| 34 | 100% | | | | | $1 \times 10^{9}$ | | |
| 35 | 100% | | | | | $1 \times 10^{9}$ | | |
| 36 | 95% | 100% | 100% | 98% | $5 \times 10^{10}$ | $3 \times 10^{9}$ | >600 | >600 |

COMPARATIVE EXAMPLE 2

Comparative Example 1 was repeated to apply the coating latex described therein to a polyethylene terephthalate film containing 0.01% by weight of silica particles having an average particle size of about 8 μm (commercially available as 'Syloid' 74), the oriented and heat-set film having a uniform thickness of about 100 μm and a residual shrinkage of less than 1% in the longitudinal and transverse directions when heated at 190° C. for 5 minutes.

The resulting film was cut into sheets measuring approximately 30×21 cm (i.e. A4 sheets) and any residual static charges resulting from cutting were eliminated from the sheets.

The suitability of the coated sheets for use in electrostatic copying machines were evaluated by feeding stacks of twenty sheets individually and continuously through a Rank Xerox 3107 electrostatic copying machine. Serious difficulties were encountered in the transport of sheets fed individually and continuously through the machine on account of electrostatic charges accumulating on the sheets.

Those sheets which fed through the electrostatic copying machine did however exhibit acceptable adhesion between the coating layer and the deposited fused toner powder image with sufficient durability for the films to be used as masters for overhead projection purposes. The adhesion of the deposited image was also tested (a) by rubbing the deposited image with ten strokes of an ink eraser whereby less than 10% of the image was removed and (b) by applying an adhesive tape over the image, rapidly ripping it off and repeating the sequence ten times whereby none of the image was removed.

EXAMPLE 37

Comparative Example 2 was repeated with the exception that the applied coating latex had the formulation used in Example 2. Sheets cut from the film fed satisfactorily through the Rank Xerox 3107 electrostatic copying machine without interruption of the sheet transport fed both individually and continuously. The deposited toner powder image was retained with adequate durability for overhead projection purposes and it was found that less than 20% of the toner image was removed by rubbing the image with ten strokes of an ink eraser and less than 30% by testing with an adhesive tape (the tests being identical with those described in Comparative Example 2). Such adhesions are acceptable for overhead projection.

I claim:

1. A process for the production of a molecularly oriented thermoplastics film having an antistatic coating layer which comprises melt extruding a self-supporting thermoplastics film, molecularly orienting the extruded film by stretching in at least one direction and applying a coating layer to at least one side of the film before the commencement of or during the molecular orientation, wherein the coating layer is applied from a film-forming composition comprising:

(i) a copolymer comprising as its major component comonomeric units of one or more alkyl esters of acrylic and methacrylic acids which is cross-linkable by means of cross-linking functional groups contained in the copolymer;

(ii) a cross-linking agent for the copolymer selected from the class consisting of condensation products of amines with aldehydes; and (iii) an aqueous solution of at least one partially neutralized acidic phosphate ester, the phosphate ester being chosen from compounds of the following structure:

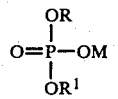

wherein

R represents an unreactive hydrocarbon radical optionally containing unreactive substituents and having a total of not more than 10 carbon atoms;

$R^1$ represents an unreactive hydrocarbon radical optionally containing unreactive substituents and having a total of not more than 10 carbon atoms or is sodium or potassium, ammonium, an amine cation or hydrogen;

M is sodium or potassium, ammonium, an amine cation, or hydrogen; wherein said aqueous solution of said phosphate ester, prior to its addition to the components of the composition which cross-link, has been prepared by partially neutralizing the corresponding acidic phosphate ester with potassium hydroxide or sodium hydroxide in an aqueous medium to a pH of 1.7 to 5 and then rendering the partially neutralized ester alkaline to a pH in the range of 7.5 to 10 by treatment with a volatile base, said volatile base being volatile at the temperature prevailing during the stretching and/or heat-setting steps which follow the application of the film-forming composition, and the amount of phosphate ester in the film-forming composition is in the range 12.5 to 100% by weight expressed as the weight of the corresponding unneutralised acid phosphate ester and based on the solids content of the rest of the composition.

2. A process according to claim 1, in which R and $R^1$ are selected from the group consisting of ethyl, n-propyl, iso-propyl, n-butyl, iso-butyl and tert-butyl.

3. A process according to claim 2, in which the phosphate ester comprises a salt of diethyl hydrogen phosphate, ethyl dihydrogen phosphate or a mixture thereof.

4. A process according to claim 1, in which the amount of phosphate ester in the film-forming composition is in the range 50 to 75% by weight expressed as the weight of the corresponding unneutralized acidic phosphate ester and based upon the solids content of the rest of the composition.

5. A process according to claim 1, in which the cross-linkable copolymer is a copolymer of ethyl acrylate, methyl methacrylate, and methacrylamide or acrylamide in the respective molar proportions 45–50:45–50:3–5 mole %.

6. A process according to claim 1, in which the volatile base is selected from the group consisting of hydroxide, triethylamine and morpholine.

* * * * *